United States Patent [19]

Ang et al.

[11] Patent Number: 4,537,809
[45] Date of Patent: Aug. 27, 1985

[54] VAN LABEL HAVING NON-LINEAR DISCONTINUOUS SCORE LINES IN THE BACKING

[75] Inventors: T. Liem Ang, South Pasadena; Donald Van Arnam, Ontario; Earl McFeaters, La Crescenta, all of Calif.

[73] Assignee: Avery International Corporation, Pasadena, Calif.

[21] Appl. No.: 515,948

[22] Filed: Jul. 20, 1983

Related U.S. Application Data

[63] Continuation-in-part of Ser. No. 28,165, Apr. 9, 1979, abandoned, which is a continuation-in-part of Ser. No. 893,002, Apr. 3, 1978, abandoned.

[51] Int. Cl.³ .................... B32B 3/30; B32B 7/06
[52] U.S. Cl. .................... 428/41; 40/2 R; 156/250; 156/257; 156/272.8; 219/121 LG; 219/121 LJ; 219/121 LK; 219/121 LL; 428/43; 428/134; 428/167; 428/169
[58] Field of Search ............ 219/121 LG, 121 LH, 219/121 LJ, 121 LK, 121 LL, 121 LN, 121 LM; 156/DIG. 80, 272.8, 250, 257; 428/40, 41, 43, 134, 167, 169; 40/2 R

[56] References Cited

U.S. PATENT DOCUMENTS

| | | |
|---|---|---|
| 3,006,793 | 10/1961 | Wheeler .......................... 428/41 |
| 3,035,957 | 5/1962 | Morgan ........................... 428/41 |
| 3,221,427 | 12/1965 | Kaplan ............................ 428/43 |
| 3,230,649 | 1/1966 | Karn ............................... 428/40 |
| 3,419,706 | 12/1968 | Lohrmann ................... 219/121 LN |
| 3,655,501 | 4/1972 | Tesch .............................. 428/136 |
| 3,719,548 | 3/1973 | Keck et al. ..................... 156/257 |
| 3,790,744 | 2/1974 | Bowen ...................... 219/121 LM |
| 3,859,157 | 1/1975 | Morgan ........................... 428/41 |
| 3,900,645 | 8/1975 | Morgan ........................... 428/41 |
| 3,909,582 | 9/1975 | Bowen ...................... 219/121 LM |
| 4,220,490 | 9/1980 | Carlson ........................... 156/257 |
| 4,356,375 | 10/1982 | Josephy et al. ............ 219/121 LJ |
| 4,390,577 | 6/1983 | Brister et al. ................... 428/134 |

FOREIGN PATENT DOCUMENTS 1043556 11/1958 Fed. Rep. of Germany ...... 156/269

Primary Examiner—William J. Van Balen
Attorney, Agent, or Firm—Christie, Parker & Hale

[57] ABSTRACT

An adhesive laminate, including a base web having a coating of pressure-sensitive adhesive and a backing removably adhered to the coating of adhesive for protecting and containing the adhesive, is described. The backing has one or more non-linear, discontinuous score lines formed, preferably, with a laser. A sine-wave, geometric pattern is also preferred. The non-linear, discontinuous score line enables a crack-and-peel feature to be introduced to the laminate backing.

19 Claims, 10 Drawing Figures

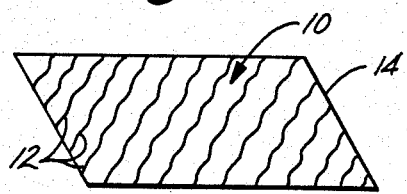
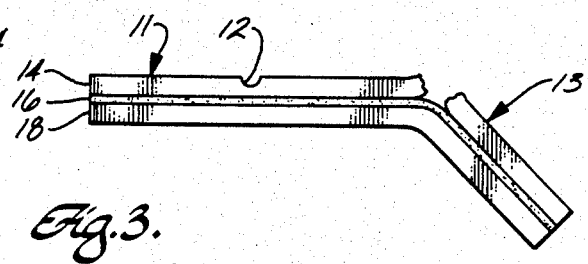
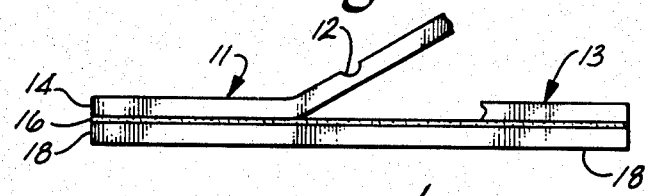
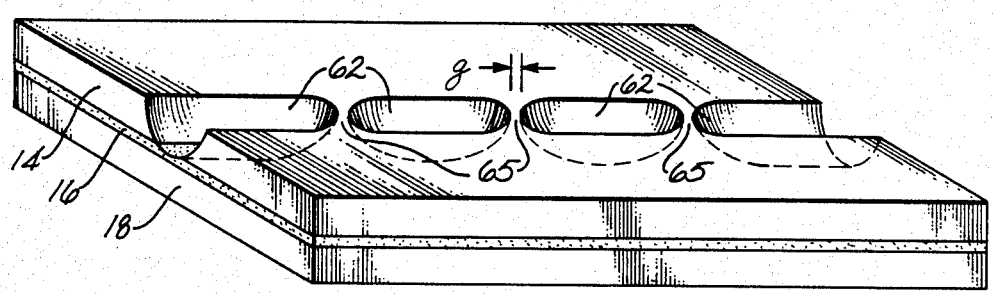
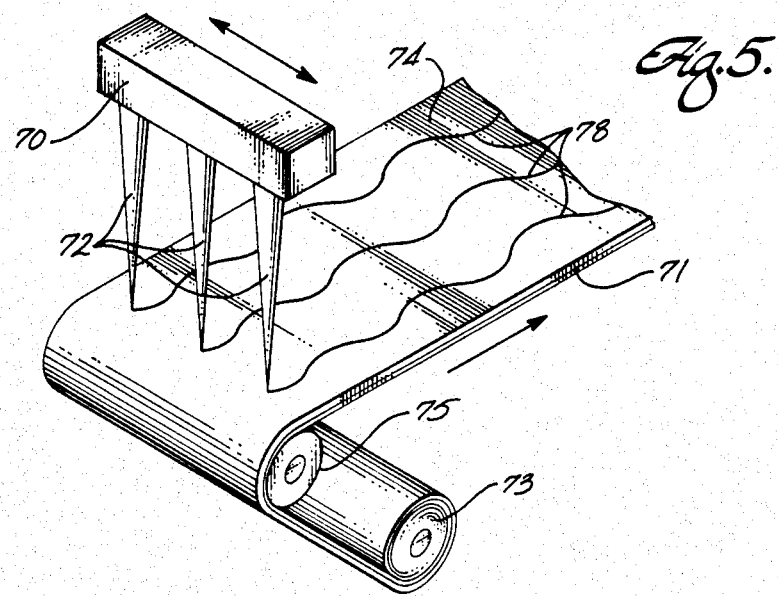

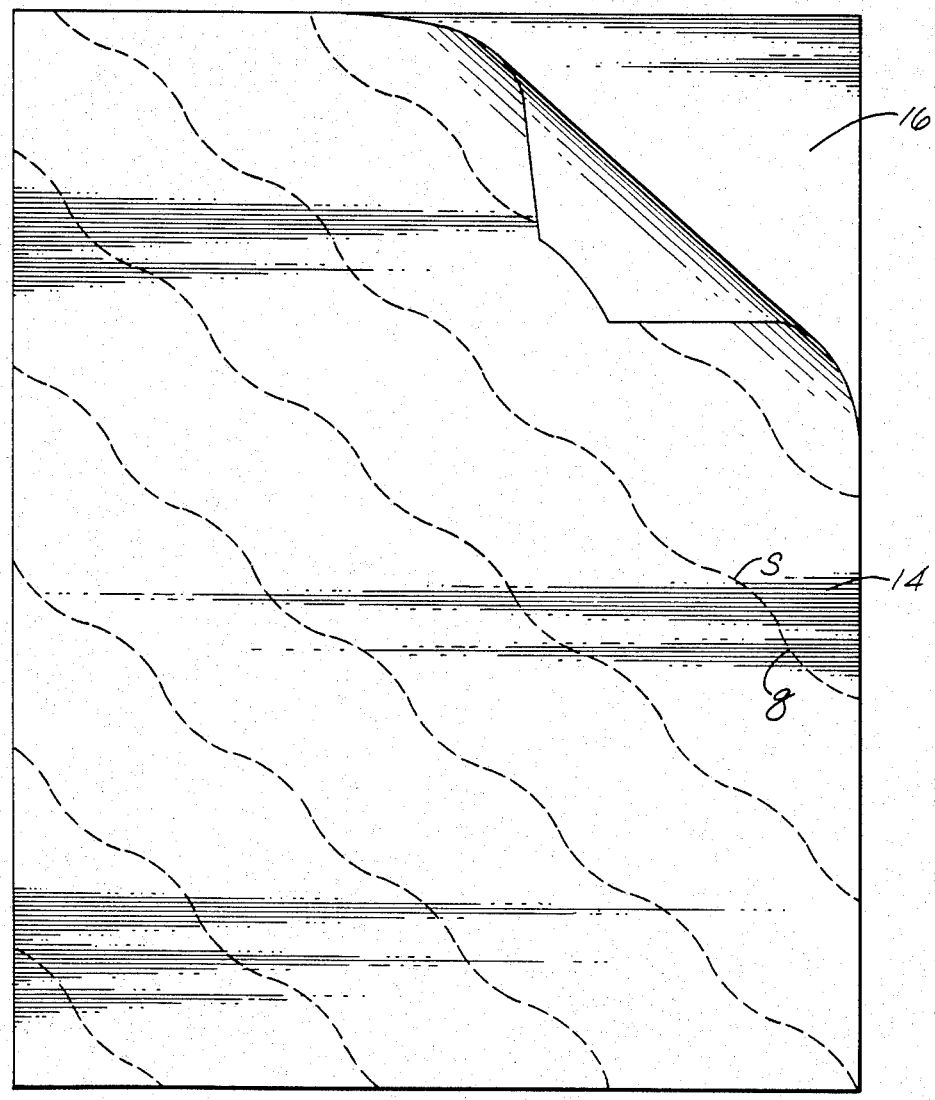

VAN LABEL HAVING NON-LINEAR DISCONTINUOUS SCORE LINES IN THE BACKING

CROSS-REFERENCE TO RELATED APPLICATIONS

This application is a continuation-in-part of U.S. application Ser. No. 28,165, filed Apr. 9, 1979, which is a continuation-in-part of U.S. application Ser. No. 893,002, filed Apr. 3, 1978, and entitled LASER-SCORED LABEL BACKINGS, each application now abandoned.

BACKGROUND OF THE INVENTION

The present invention relates to adhesive laminates having pressure-sensitive adhesives and a protective backing removably adhered to the adhesive, more particularly to such laminates having scored backings which can be easily removed from the laminate.

Adhesive laminates having removable backings that have been modified in a variety of ways to facilitate removal of the backings have been described. U.S. Pat. No. 3,230,649 to Karn describes adhesive laminates, such as label stock, in which the backing has a plurality of cuts so arranged that when a label of a certain minimum size is cut from the stock, at least one cut or portion of a cut will be found on the backing of the label. Both curved and straight cuts are shown, as well as cuts which extend only part of the way through the thickness of the backing sheet. Although such cuts offered a convenient starting point for removing the backing, it would often be necessary to remove the backing in more than two pieces, because the backing would tear between the cuts. The arrangement of aligned cuts spaced to provide a backing that ruptures when flexed is not described.

U.S. Pat. No. 3,006,793 to Wheeler describes adhesive laminates having backing sheets that can be removed in two pieces, at most, regardless of the size of the sheet being removed. The backing sheet has a number of embrittled zones or lines which are formed by applying an acid, such as sulfuric acid, or by using heat or ultraviolet radiation to embrittle narrow strips of the backing. When the laminate is bent sharply away from the backing side along a line of embrittlement, the backing cracks along the line, forming two continuous pieces of backing. The backing sheet has sufficient tensile strength in the embrittled zones so that it does not normally crack in the zones, unless deliberately bent more than is necessary to separate the backing from the rest of the laminate. Thus, the backing of a particular label containing many lines of embrittlement may be cracked selectively along one line of embrittlement and then removed in two continuous pieces. The ability of such a backing to be removed in two continuous pieces, at most, which is referred to herein as "pull-across", is highly desirable, particularly in large labels including many lines of embrittlement.

U.S. Pat. No. 4,264,662 to Taylor is an improvement to the '793 patent in the use of a polymer to seal zones of embrittlement.

U.S. Pat. No. 3,859,157 to Morgan describes adhesive laminates having backing sheets in which weakened areas or score lines are formed by mechanical crushing of the fibers of the backing. When the laminate is flexed away from the backing side, the backing ruptures at the score line, offering an easy starting point for removal of the backing. The score lines are made continuous or discontinuous to leave sufficient strength in the backing sheet, whereby it can be readily further-processed or prepared for use without any danger of splitting or tearing. Such a backing could not readily be removed in two pieces, at most, because the discontinuities in the score lines are said to be on the order of from ¼ to ½-inch long and spaced at intervals of from 1 to 4 inches. Such discontinuities would prevent the backing from cracking clearly, and the backing would tend to tear irregularly between score lines.

U.S. Pat. No. 3,909,582 to Bowen, incorporated herein by reference, describes a method for forming a line of weakness, such as a tear line in a laminate, with the use of a laser. Described laminates may include layers of adhesive and of paper. The use of a pulsed carbon-dioxide laser and the selective scoring of a paper layer of a laminate are also described. However, the patent does not describe adhesive laminates having pressure-sensitive adhesives and backing sheets that can be cracked by bending the laminate and removed in two pieces, at most.

U.S. Pat. No. 3,419,706 to Lorhman, incorporated herein by reference, describes the use of a laser to cut paper. Pressure-sensitive-adhesive laminates having laser-scored backings are not described.

SUMMARY OF THE INVENTION

Practice of this invention provides an adhesive laminate comprising a base web having a coating of pressure-sensitive adhesive on at least one major surface thereof, and a fibrous backing removably adhered to the coating of adhesive for protecting and containing the adhesive, wherein the fibrous backing has at least one non-linear, discontinuous score line extending between two edges of the laminate. The score line is in the form of a harmonic or a non-harmonic, geometric pattern extending across the backing. A harmonic pattern generally in the form of a sine wave is preferred. The score line is formed by a knife or by a laser, preferably by a laser, of a series of axially-aligned, scored segments, the ends of which are separated by unscored gaps of from about 0.005 to about 0.06 inch in length. The length of the gaps is such that the backing cracks or ruptures cleanly when the laminate is bent toward the base-web side along the score line, and the backing has sufficient tensile strength through the non-linear, non-cracked score line that the backing does not rupture, i.e., retains integrity, at each score line upon separation of the backing from the base web and adhesive, unless the backing is bent more than is necessary to accomplish the separation. Wavelength and amplitude are such that complete cracking of one such score line upon bending of the backing is not reduced or impaired. The wavelength is selected from about 0.5 to about 6 inches, preferably from about 1 to about 4 inches, more preferably from about 1.5 to about 3 inches. The amplitude is selected from between about 0.03 to about 0.5 inch. The cut score may vary from about 0.01 to about 0.5 inch. The score is at least about 80%, preferably more than about 90%, of the thickness of the backing. The cut scores can extend the depth of the backing and beyond.

In the product, an adhesive laminate is provided having a plurality of such score lies, so arranged thereon that when an individual section of a predetermined minimum size is cut from the laminate, at least one score line extends between two edges of the section. This enables a "crack" to occur upon sufficient flexing. Non-linear scores enable peel across without cracking.

Preferably, the score lines are formed by generating an intense, concentrated beam of radiation, such as laser radiation, which has sufficient energy density to vaporize portions of the backing to a controllable depth, directing the beam against the surface of the backing, and imparting relative motion to the beam and the laminate for scoring the backing along a predetermined line. The laser is pulsed on and off so as to form alternating scored segments and unscored gaps in the backing along the path of the relative motion of the beam. Knife cutting and the like may also be used.

BRIEF DESCRIPTION OF THE DRAWINGS

FIG. 1 shows an adhesive laminate sheet having continuous score lines in skewed relation to the edges of the sheet;

FIG. 2 shows, in cross-section, how the backing of an adhesive laminate of the present invention ruptures along a score line when the laminate is bent toward the base-web side;

FIG. 3 shows, in cross-section, how a portion of the backing that includes a score line can be separated from the base web and adhesive without rupturing;

FIG. 4 is an enlarged cross-section of a portion of a scored laminate showing a discontinuous score line formed in accordance with this invention;

FIG. 5 shows an adhesive laminate, in continuous-roll form, being scored, in accordance with this invention, with a plurality of laser beams;

FIG. 8 shows how the elements of the non-linear, discontinuous score lines cooperate to provide a crack-and-peel feature;

DETAILED DESCRIPTION

Figure 6:
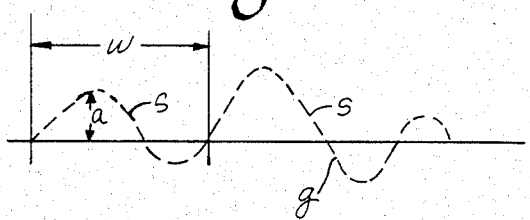
FIGS. 6 and 7 illustrate the non-linear, discontinuous score line criteria.

With reference to FIGS. 1, 2, 8, 9 and 10, adhesive laminates 10 of the present invention comprise a base web 18, a coating of pressure-sensitive adhesive 16 on at least one major surface of the base web, and a fibrous backing 14 removably adhered to the coating of adhesive for protecting and containing the adhesive. Such laminates may be used as label stock; decorative adhesive sheeting; double-stick sheeting, such as mountings for photographs; double-stick adhesive tapes; and the like.

The backing can be of any material that can be cracked or ruptured by bending along a discontinuous score line 12, especially, as illustrated in FIG. 5, a laser-scored line formed in accordance with this invention. The essential property is that the backing can be cracked cleanly at the unscored gaps (g), such as gaps 65 in FIG. 4, when the laminate of which the backing is a part is bent toward the base-web side, the degree of bending preferably being insufficient to cause creasing or other damage to the base web. One material having this property is kraft paper, an economical backing material commonly used in pressure-sensitive-adhesive laminates. Other papers and other fibrous materials, such as synthetic cellulosic materials, cloth, and non-woven synthetic fabrics, can display the desired property when the average length of the fibers is small or when the individual fibers are relatively brittle. Non-fibrous materials, such as polymer films, can have the desired property when they are relatively brittle or have low tensile strength and low elongation when stretched to the breaking point.

Evaluation of a proposed backing material is best conducted by testing a laminate under the actual conditions of use, because the property of cracking at the unscored gaps when bent depends upon the relation between the nature of the backing material and the length of the unscored gaps. For example, an unscored sheet of kraft paper can be repeatedly bent, or even sharply creased, before it will crack. However, as will be described herinafter in greater detail, when the sheet is scored to form a non-linear, discontinuous score line having gaps of a very small, critical-maximum size, the sheet cracks along the score line when a laminate including such a sheet is bent to a moderate degree, insufficient to cause damage to the face of the laminate. Paper is preferred for low cost and for good performance in laminates of this invention. The backing ordinarily has a release coating, such as a silicone release coating, on the side in contact with the adhesive.

Figure 7:
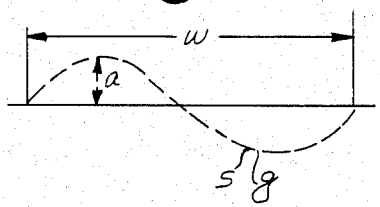
Figure 10:
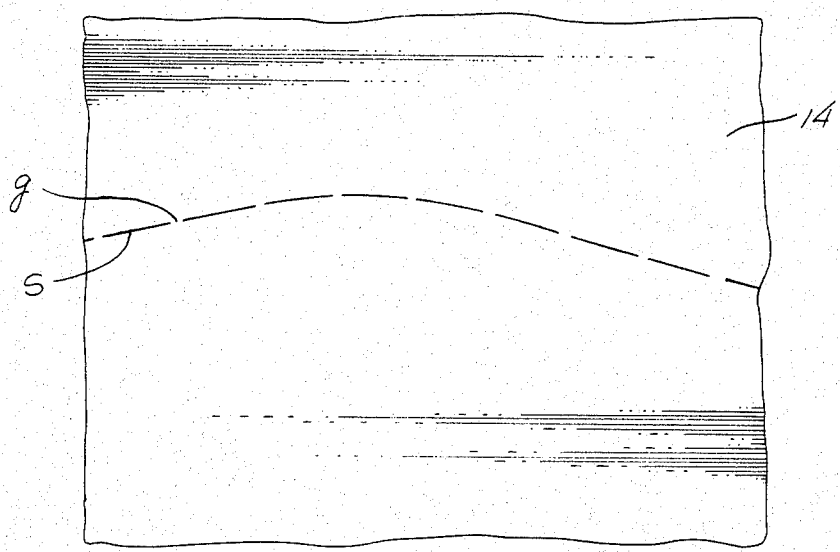
FIG. 10 is a detail of FIG. 9, magnified 5 times.

In an adhesive laminate of the present invention, the backing sheet has at least one non-linear, discontinuous score line in a non-harmonic pattern, as depicted in FIG. 6, or in a harmonic pattern, such as is generally depicted in FIG. 7. Although curved patterns are preferred, zig-zag, sawtooth, and like non-linear patterns may also be used. Sine-wave geometric configurations, as shown in FIGS. 1, 5, 7, 8, 9 and 10, preferably a plurality of such score lines, extend between two edges of the laminate. FIG. 1 shows such a laminate 10 having a backing 14 in which a plurality of discontinuous score lines 12 have been formed. Such discontinuous score lines are so formed that when the laminate is bent or flexed along the discontinuous score line toward the base-web side, the backing "cracks" or ruptures, as shown in FIG. 2. In FIG. 2, a laminate having base web 18, a coating of adhesive 16, and backing 14, are shown bent toward the base-web side. The backing has ruptured at a score line 12 into two separate, continuous pieces 11 and 13.

In FIGS. 3 and 8, the piece 11 of the backing of the laminate shown in FIG. 2 is removed. The piece 11 of the backing has sufficient tensile strength through the unruptured or non-cracked score line 12 so that it does not rupture or crack at that line upon separation from the base web and adhesive. This illustrates the concept of "pull-across."

In summary, the invention is an improvement to the art of providing "crack-and-peel" label constructions. It resides in providing a non-linear, discontinuous score, providing two unique features: (1) the ability to achieve clean edge-to-edge "crack" at any score line by sufficient bending of the laminate, as illustrated by FIG. 2; and (2) the ability to "peel" from the crack because of the use of a non-linear, discontinuous score line of the dimensions defined herein, as illustrated in FIGS. 3 and 8.

The ability of the backing to crack or rupture along a score line to form two separate pieces is referred to as "crackability," and is an essential feature of adhesive laminates of the present invention. Crackability enables the backing sheet to be divided cleanly into two pieces 11 and 13, each of which can be removed separately from the adhesive laminate.

In order to achieve such crackability, the score lines are continuous and intersect an edge of the laminate at two points. For example, the score line may intersect two parallel or perpendicular edges of a laminate, or it may intersect the edge of a round or oval laminate at two points. If discontinuities are left in the score line, as in the above-mentioned Karn and Morgan patents, crackability is non-existent, or may be lost, because the unscored portions of the backing can be sufficiently flexible to survive considerable bending, even sharp creasing or repeated flexing. Such creasing or flexing is, of course, undesirable, because it would result in damage to the other side of the laminate, such as the face of a label. Furthermore, it would be difficult to remove the backing in two pieces, at most, because the backing would tend to tear irregularly at such discontinuities in the score line.

The depth of the scored segments of the discontinuous score line is, by definition, greater than zero, preferably at least 80%, more preferably at least 90%, of the depth of the backing. The depth of the scored segment can be equal to or slightly greater than the thickness of the backing sheet, so that the score extends slightly into the adhesive layer of the laminate. Preferably, to preserve the strength and appearance of the base web, e.g., the label face, the depth of the score does not extend into the base web 18.

In an embodiment of the invention, the depth of the scored segments is substantially uniform and is about equal to the thickness of the backing, or slightly greater, as shown in FIG. 4, wherein scored segments 62 are formed in the backing 14. The scored segments extend into the adhesive 16. A typical backing, such as kraft paper, has a thickness in the range of from about 0.001 to 0.01 inch, typically from about 0.002 to 0.0906 inch. As indicated, it is desirable to regulate the depth of the scored segments to at least 80% of the thickness of the backing sheet, and preferably to at least 90% of the thickness, the depth of the cut being selected to give good crackability of the scored segments. It is desirable to leave a little of the thickness of the backing intact at the bottom of the scored groove, to help contain the adhesive and to avoid oozing of the adhesive out of the groove. However, because the thickness of a backing, such as kraft paper, can vary by as much as 10%, owing to manufacturing tolerances, it can be difficult to regulate the depth of the score accurately enough to do so. In that event, an adhesive having relatively-high shear and little tendency to ooze, can be used. The formulation of such adhesives is well known and need not be described herein.

With reference to FIGS. 6, 7, 8, 9 and 10, the scored segments (s) are separated by unscored gaps 65, or (g), at intervals along the length of the discontinuous, non-linear score line. As used herein, the term "score line" means non-linear and discontinuous, and includes both the scored segments and the gaps. The intervals can be harmonic (periodically spaced) or non-harmonic (randomly spaced). Ordinarily, the intervals are harmonic, because convenient methods for forming scored segments and gaps produce gaps at periodic intervals. By controlling the ratio of the lengths of the scored segments to the lengths of the gaps, the desired balance between crackability and pull-across can readily be achieved. The ratio can be varied to accommodate different materials and requirements.

The gaps between scored segments of the score line are from about 0.005 to about 0.06 inch in length, and the scored segments are from about 0.01 to about 0.5 inch in length. In particular, for a 50-pound natural kraft paper backing, the unscored gaps are from about 0.007 to about 0.06 inch, and preferably from about 0.01 to about 0.03 inch when the scored segments are from about 0.01 to about 0.5 inch, and in the preferred embodiment, from about 0.05 to about 0.15 inch. For a 75-pound natural kraft paper backing, the gaps are from about 0.005 to about 0.05 inch, and preferably from about 0.007 to about 0.02 inch when the scored segments are from about 0.01 to about 0.5 inch, and in the preferred embodiment, from about 0.03 to about 0.15 inch.

The use of score lines in a sine-wave, geometric pattern (sinusoidal) is preferred and provides a number of advantages in manufacture. The terms "sine wave" and "sinusoidal" are used herein in a generic sense to refer to a wavy-line, geometric pattern that is a sine wave or that is similar to a sine wave, i.e., having a series of waves of substantially-equivalent amplitude and wavelength. When a laminate having such score lines is bent away from the backing side, the peaks of the score lines tend to rise up, offering conveniently-graspable tabs for peeling the backing from the laminate.

The use of non-linear score lines improves pull-across because, as a portion of backing having such a score line is peeled from a laminate, the stresses involved in peeling the backing are distributed, as shown in FIG. 8, across segments where there is always some support. By contrast, a straight score line would not enable "peel," since it is likely to crack unexpectedly.

Another advantage to the use of non-linear score lines, rather than straight score lines, is that a sheet of laminate having non-linear score lines retains more of its original stiffness than a sheet having straight score lines. The stiffness of a sheet of adhesive laminate, such as label stock, is of interest to printers who print indicia on sheets of the label stock and stand the sheets on edge in racks to let the ink dry. Sheets having insufficient stiffness can lean or buckle in the racks and touch one another, thus marring the indicia before the ink dries.

Referring to FIG. 5, a presently-preferred method of scoring the backing of an adhesive laminate is shown. Energy from a laser source 70 is split into a plurality of beams 72. For example, up to 32 beams or more can be used, depending upon the width of the laminate. Three beams are shown in FIG. 5 for clarity. Adhesive laminate 74 from a continuous roll 73 of laminate is passed over a roller 75 beneath the laser beams, with the backing sheet 71 facing the laser beams. The linear velocity of the laminate past the laser beams is held constant, and the laser beams are reciprocated along a line perpendicular to the direction of motion of the laminate. The beams 72 are pulsed electronically to provide the unscored segments in the score line.

Figure 9:
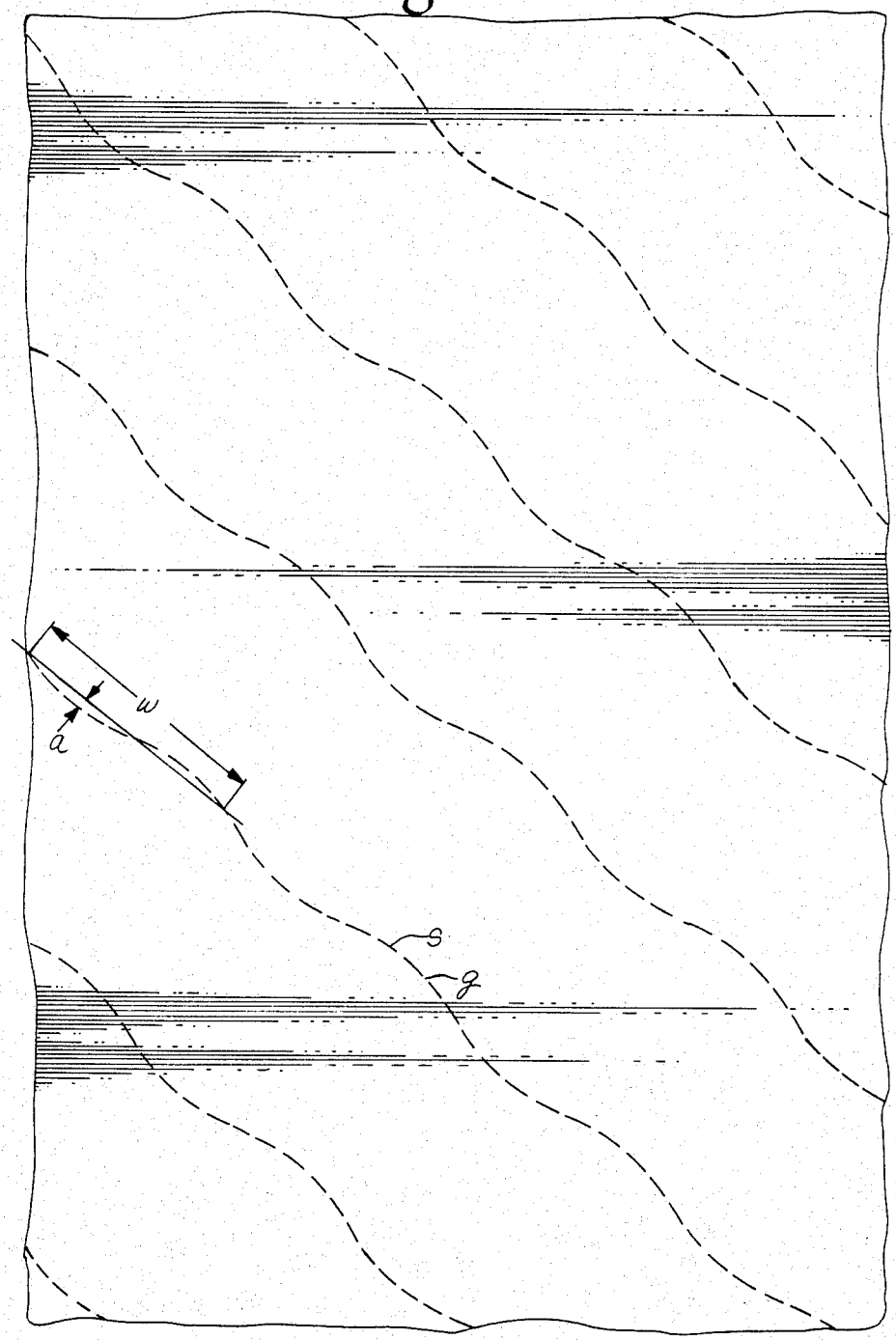
FIG. 9 shows a preferred arrangement for the score lines.

With reference to FIGS. 6, 7 and 9, the wavelength (w) between any three intersections of the best line $c$ drawn through the pattern of the score line, and the amplitude (a) of the score lines, are selected to provide a good balance of crackability and pull-across. If the amplitude is too high, crackability can suffer, because the stress of the bending forces can be distributed over too wide an area. If the wavelength is too long, sections cut from the laminate can contain only a small part of the wave, which would act, in effect, as a straight line. In addition, if the wavelength is too long, the advantage of improved pull-across can be diminished. Nevertheless, wide ranges of wavelengths and amplitudes can be used to achieve a desirable result. The wavelength can be used to achieve a desirable result. The wavelength can be in the range of from about 0.5 to 6 inches, preferably from about 1 to about 4 inches, and more preferably from about 1.5 to about 3 inches. The amplitude can be in the range of from about 0.03 to about 1.0 inch, preferably from about 0.03 to 0.5 inch, and more preferably from about 0.06 to about 0.25 inch.

The score lines can be oriented on the backing of an adhesive laminate in any desired way. It is desirable to arrange the score lines so that when sections are cut from a scored laminate, the score lines run diagonally across the backs of the sections. Two intersecting sets of score lines can be formed so that score lines run diagonally in both directions across the back of the laminate. This arrangement is desirable because it can produce convenient starting points at all four corners of the section for cracking and removing the backing.

Although discontinuous score lines can be formed mechanically by cutting, the use of a laser is highly preferred for speed of production, simplicity, reliability and precision. With a laser, an intense beam of radiation is directd against the surface of the backing, and portions of the backing upon which the beam of laser radiation falls absorb the radiation and are almost instantaneously vaporized, creating a clean, scorch-free score line. The backing cracks cleanly along even a relatively-shallow, laser-scored line when bent sufficiently. The portions of the backing sheet at the unscored gaps maintain the continuity of the backing sheet by bridging the score line. Such gaps or bridges also provide the backing sheet with sufficient tensile strength through the score line so that a backing having such a score line does not rupture, i.e., remains continuous, at the score line upon separation from the base web and adhesive, unless bent more than is necessary to accomplish the separation.

Lasers useful for scoring the backing of an adhesive laminate in accordance with the practice of this invention are known and are available commercially. Industrial lasers include gaseous lasers, such as carbon dioxide or helium-neon lasers; solid-state, light-pumped lasers, such as ruby neodymium yttrium aluminum garnet (Nd-YAG) lasers or glass lasers; semi-conductor lasers; and lasers using conjugated, organic molecules, such as benzene, toluene, or naphthalene. The choice of laser for scoring depends upon the material of the backing. Paper essentially completely absorbs the infrared output of a gaseous, carbon-dioxide laser, which has a wavelength of 10.6 microns. Such a laser is thus preferred in the practice of this invention. One such carbon-dioxide laser is available from Coherent Radiation of Palo Alto, California.

One laser can be used to generate a number of beams with the use of beam splitters, as is known in the art. The beams can be focused with lenses transparent to the radiation involved; for example, germanium, gallium arsenide, and sodium chloride lenses can be used to focus infrared radiation from a carbon-dioxide laser. Required power output depends upon the number of beams being powered, the backing-sheet material, the width and depth of the score, and the rate of advance or relative velocity of the beam and the laminate.

The beam from a carbon-dioxide laser emitting at a wavelength of 10.6 microns can be focused to a spot of from about 0.002 to 0.02 inch in diameter, depending in part upon the focal length of the lens. For example, useful score lines can be formed with a carbon-dioxide laser focused with lenses having focal lengths of from 1.5 to 10 inches. Smaller spot sizes provide higher energy densities and faster rates of scoring than do larger spot sizes. The distribution of energy across the diameter of the focused spot can vary in accordance with the gaussian distribution or with more complex distributions, but is generally highest in the center. Consequently, the score line is deepest in the center and less deep at the edges.

As stated in U.S. Pat. No. 3,909,582, mentioned above, a carbon-dioxide-gas laser emitting a single 25-watt beam having a gaussian energy distribution and focused to a spot of about 0.0025 inch in diameter can be used to form a score line or a line of weakness in paper at relative velocities of up to about 500 feet per minute. In a particular installation, the power, spot size, and relative velocity of the beam and the laminate can readily be adjusted to give the desired width and depth of scoring. Visual inspection of score lines with a simple magnifier of about 5 diameters or more reveals whether the scoring is discontinuous and whether the deepest points of scoring are greater than the thickness of the backing. Qualitative manual tests for crackability and pull-across are employed to determine whether the scored backing performs as desired.

The relative lengths of the scored segments and the unscored gaps can be varied by pulsing the laser beam. The term "pulse" is used herein to indicate a manner of operating the laser in which the beam alternatively has zero intensity and full intensity. The beam can be pulsed electronically, a feature which is available on industrial lasers, or mechanically, for example, with a motor-driven chopper.

As stated earlier, because of the energy distribution across the focused spot of the laser beam, the score line is deeper in the center than at the edges. In addition, when a pulsed laser beam is switched from the full intensity-level to the zero intensity-level, the intensity drops off very rapidly, but over a finite period of time. Conversely, when the laser is switched from zero intensity to full intensity, the intensity rises to its maximum level over a very short but finite period of time. Thus, if a laser beam is pulsed while the laminate is moved at constant velocity beneath the beam, the score line has the form of a series of scored segments or dashes whose lengths correspond to the duration of the full-intensity pulse of the beam, and the distance between dashes, i.e., the gaps, corresponds to the duration of the periods of zero intensity between pulses of the beam. Because of the energy distribution across the beam spot and because of the finite time necessary for the beam to turn on or off, the ends of the scored dashes taper over a short distance from full depth to zero depth. As the duration of the period of zero intensity of the beam is made smaller and smaller, the distance between the scored dashes diminishes. Eventually, the shallow ends of consecutive, scored dashes begin to merge.

The depth of the scored segments can be controlled by regulating the relative velocity of the beam and the laminate, the power output of the laser, the diameter of the focused spot, or combinations of these. When the velocity is lower, the score is deeper. When the velocity is higher, the score is shallower.

In the practice of this invention, the shallow ends of the dashes are not permitted to merge, so that an unscored bridge of fibers separates consecutiuve dashes. The bridge is relatively narrow at the top, or outer surface of the backing, and relatively wide adjacent the adhesive layer, because the ends of the scored dashes taper. When the ends of the scored segments are allowed to merge slightly, leaving partly-scored bridges, crackability is excellent and pull-across is acceptable. When, in accordance with this invention, the ends of the scored segments do not merge, leaving tiny, definitely-unscored bridges, it has surprisingly been found that crackability remains excellent and pull-across is also excellent. One would not expect unscored bridges to crack at all and, in fact, the length of the unscored upper surface of the bridges, measured along the score line, must be critically controlled, because an unscored bridge as little as 0.01 too long does not crack under the conditions of use contemplated herein. The number of gaps per inch of score line can be adjusted by setting the pulse rate of the laser to give the desired number of scored dashes per inch of score line and then adjusting the duration of each pulse until consecutive dashes are separated by an unscored gap of the desired length.

As the term is used herein, the "length" of the unscored bridges corresponds to the dimension (g) indicated in FIG. 4. The unscored gaps can be very small but may be visible to the unaided eye. They are readily visible through a simple magnifier. A sufficient number of the unscored gaps 65 are formed per unit-length of score line to provide the backing with sufficient strength for good pull-across. The number of gaps per inch of score line can vary widely, depending in part upon the thickness of the backing sheet and upon the force required to peel the backing sheet from the layer of adhesive. Ordinarily, the number of gaps will be in the range of from about 1 to about 25 per inch, typically, from about 5 to about 15 per inch.

Sheets of laminate having diagonal score lines can be made by moving sheets of laminate under a bank of laser beams in a direction that is skewed with respect to the sides of the sheets. When scoring a continuous strip of laminate from a roll, as shown in FIG. 5, it can be more convenient to make the score lines generally parallel to the sides of the laminate strip. The spacing between score lines is selected so that at least one score line, preferably several score lines, appears on the backing of a section of predetermined minimum size to be cut from the stock, such as the smallest label to be cut from scored label stock.

In laminates of the present invention, any conventional base-web material can be used, such as paper, plastic, cloth and the like. Likewise, any conventional pressure-sensitive adhesive, including natural and synthetic, rubber-based, and acrylic-based adhesives, can be used. The following Examples serve to illustrate practice of the present invention.

EXAMPLE 1

A carbon-dioxide laser emitting infrared radiation of 10.6-micron wavelength at 35-watt output was focused with a 2½-inch germanium lens on the kraft paper backing (50-pound Mando) of a conventional label stock. The backing was from about 0.002- to about 0.004-inch thick. The stock was moved past the laser beam at a rate of from 197 to 200 feet per minute, and the beam was reciprocated with a crank linkage to produce a sinusoidal score line having a wavelength of about 2 inches and an amplitude of about 0.09 inch. The lines were spaced about 2 inches apart. The laser was pulsed at the rate of 300 pulses per second, and the duration of each full-intensity pulse was about 3.0 milliseconds. As a result, individually-scored dashes, separated by tiny, unscored bridges of fibers, were formed, corresponding to the periods between pulses of the full-intensity laser beam.

The bridges or gaps were about 0.0154 inch long, and there were about 7 such bridges or gaps per inch of score line. The depth of the scored dashes formed by the full-intensity beam was slightly greater than the thickness of the backing, and the width was about 0.01 inch.

The resulting score line displayed excellent crackability and pull-across. Because of unavoidable error, variations in the relative velocity of the beam and the laminate, and assorted other tolerances when measured along the score line, the length of the bridges varied from 0.0113 inch to 0.0180 inch (5 measurements). The average length was 0.0154 inch. The majority of the bridges appeared definitely unscored under microscopic examination. The shorter bridges, constituting a significant minority of the total, appeared to have suffered some degradation at their upper surfaces, but did not appear to be definitely scored. No definitely-, partly-scored bridges were apparent.

EXAMPLE 2

The experiment of Example 1 was repeated in all particulars, except that the pulse duration was shortened to 2.75 milliseconds. The resulting bridges were all clearly unscored, having an average length of 0.0338 inch, and the score lines were not crackable.

For the 50-pound Mando backing and the laminate used in the Examples, an unscored bridge length of about 0.015 inch provided the best balance between crackability and pull-across. Comparison of Examples 1 and 2 shows that the adjustment of the pulse duration is quite critical. The precise setting required for a different material or for a different laser can be determined in a very short time by setting the pulse frequency to give the desired number of pulses per inch of score line, setting the pulse duration to about 90% of the reciprocal of the pulse frequency, forming a score line, examining the line at a magnification of a few diameters or more, and making an appropriate adjustment in the pulse duration.

In another embodiment of the invention, a laminate comprises a stretchable base web, a layer of pressure-sensitive adhesive, and a backing scored as described herein. Exemplary of such a laminate is a rubber printing plate, which is prepared for use by photoetching or photoengraving techniques, and is affixed to a printing press by removing the backing and applying the adhesive side of the printing plate to the press. Other examples include pressure-sensitive adhesive coverings, such as vinyl coverings, and rubber insulating tapes. In such a laminate, the backing can be ruptured at a score line by stretching the base web. The backing has sufficient tensile strength through a score line so that it does not rupture at the score line upon separation from the base web unless bent or stretched more than is necessary to accomplish the separation.

Although this invention has been described in terms of particular details and embodiments thereof, the particulars of the description are intended to illustrate the invention, and many modifications of the invention may be made within the scope of the following claims.

In a preferred construction depicted in FIG. 9, the preferred dimensions are: w=2 1/16"1; a=0.09"; s=0.105"; and g=0.007".

What is claimed is:

1. An adhesive laminate comprising:
(a) a base web having a coating of pressure-sensitive adhesive on at least one major surface and a backing removably adhered to the coating of pressure-sensitive adhesive for protecting and containing the pressure-sensitive adhesive; and (b) at least one non-linear, discontinuous score line extending across the backing and intersecting two edges of the backing, the score line comprising scored segments, wherein a portion of the backing has been cut, of from about 0.01 to about 0.5 inch in length and a depth of at least 80 percent of the thickness of the backing, separated by unscored segments of from about 0.005 to about 0.06 inch in length, said non-linear, discontinuous score line having a wavelength of from about 0.5 to about 6 inches and an amplitude of from about 0.03 to about 1.0 inch, said backing of the laminate having both crackability and pull-across.

2. An adhesive laminate as claimed in claim 1 in which the wavelength is from about 1 to about 4 inches.

3. An adhesive laminate as claimed in claim 1 in which the wavelength is from about 1.5 to about 3 inches.

4. An adhesive laminate as claimed in claim 1 in which the amplitude is from about 0.03 to about 0.5 inch.

5. An adhesive laminate as claimed in claim 1 in which the amplitude is from about 0.06 to about 0.25 inch.

6. An adhesive laminate as claimed in claim 1 wherein the backing is kraft paper.

7. An adhesive laminate as claimed in claim 1 wherein the backing is 50-pount kraft paper, the unscored segments are from about 0.007 to about 0.06 inch in length, and the scored segments are from about 0.01 to about 0.5 inch in length.

8. An adhesive laminate as claimed in claim 7 wherein the unscored segments are from about 0.01 to about 0.03 inch in length and the scored segments are from about 0.05 to about 0.15 inch in length.

9. An adhesive laminate as claimed in claim 1 wherein the backing is 75-pound kraft paper, the unscored segments are from about 0.005 to about 0.05 inch in length, and the scored segments are from about 0.01 to about 0.5 inch in length.

10. An adhesive laminate as claimed in claim 9 wherein the unscored segments are from about 0.007 to about 0.02 inch in length ahd the scored segments are from about 0.03 to about 0.15 inch in length.

11. An adhesive laminate comprising:
(a) a base web having a coating of pressure-sensitive adhesive on at least one major surface and a backing removably adhered to the coating of the pressure-sensitive adhesive for protecting and containing the pressure-sensitive adhesive; and
(b) at least one discontinuous score line extending in a sine-wave pattern across the backing and intersecting two edges of the backing, the score line comprising scored segments, wherein a portion of the backing has been removed, of from about 0.01 to about 0.5 inch in length and a depth of at least 80 percent of the thickness of the backing, and unscored segments of from about 0.005 to about 0.06 inch in length, said discontinuous score line having a wavelength of from about 0.5 to about 6.0 inches and an amplitude of from about 0.03 to about 0.5 inch, said backing of the laminate having both crackability and pull-across.

12. An adhesive laminate as claimed in claim 11 in which the wavelength is from about 1 to about 4 inches.

13. An adhesive laminate as claimed in claim 11 in which the wavelength is from about 1.5 to about 3 inches.

14. An adhesive laminate as claimed in claim 11 wherein the backing is kraft paper.

15. An adhesive laminate as claimed in claim 11 wherein the backing is 50-pound kraft paper, the unscored segments are from about 0.007 to about 0.06 inch in length, and the scored segments are from about 0.01 to about 0.5 inch in length.

16. An adhesive laminate as claimed in claim 15 wherein the unscored segments are from about 0.01 to about 0.03 inch in length and the scored segments are from about 0.05 to about 0.15 inch in length.

17. An adhesive laminate as claimed in claim 11 wherein the backing is 75-pound kraft paper, the unscored segments are from about 0.005 to about 0.05 inch in length, and the scored segments are from about 0.01 to about 0.5 inch in length.

18. An adhesive laminate as claimed in claim 17 wherein the unscored segments are from about 0.007 to about 0.02 inch in length and the scored segments are from about 0.03 to about 0.15 inch in length.

19. An adhesive laminate as claimed in claim 1 in which the discontinuous score line is in the form of a sine wave.

* * * * *

UNITED STATES PATENT AND TRADEMARK OFFICE
CERTIFICATE OF CORRECTION

PATENT NO. : 4,537,809

DATED : August 27, 1985

INVENTOR(S) : T. Liem Ang, et al.

It is certified that error appears in the above-identified patent and that said Letters Patent is hereby corrected as shown below:

IN THE SPECIFICATION

Column 2, line 65, change "lies" to -- lines --.

Column 7, line 21, change "directd" to -- directed --.

Column 10, line 64, change "g=0.007"" to -- g = -.007" --.

IN THE CLAIMS

Column 11, line 31, change "pount" to -- pound --.

Column 11, line 46, change "ahd" to -- and --.

Signed and Sealed this

Twelfth Day of April, 1988

Attest:

DONALD J. QUIGG

*Attesting Officer*  *Commissioner of Patents and Trademarks*